April 1, 1969 V. K. RICE 3,436,746

ELECTRICALLY ALTERABLE MEMORY SYSTEM HAVING AUTOMATIC REWRITE

Filed June 30, 1965

INVENTOR
VERNER K. RICE
BY C. A. Gullbrandsen
ATTY.

United States Patent Office 3,436,746

Patented Apr. 1, 1969

3,436,746

ELECTRICALLY ALTERABLE MEMORY SYSTEM HAVING AUTOMATIC REWRITE

Verner K. Rice, Lombard, Ill., assignor to Automatic Electric Laboratories, Inc., Northlake, Ill., a corporation of Delaware Filed June 30, 1965, Ser. No. 468,244

Int. Cl. G11b *5/00, 5/12*

U.S. Cl. 340—174 2 Claims

ABSTRACT OF THE DISCLOSURE

A core memory having only two conductors per bit location has automatic rewriting of information by employing a core buffer word between the memory array and the output circuits and utilizing the trailing edges of the reading pulses for controlling the reinsertion of information.

This invention relates to magnetic memory systems and in particular to electrically alterable semipermanent magnetic memory systems.

Several types of electrically alterable semipermanent memory systems are known in the art. Generally such systems require a regeneration of information upon readout to restore the extracted information. These systems usually employ a read conductor, a read-write conductor and a sense conductor for each core in the case of magnetic core arrays. One such memory is described by R. Gouttebel in his United States patent application, Sensing Device for Magnetic Core Memories, Ser. No. 189,779, filed Apr. 24, 1962, now Patent Number 3,210,744 and assigned to the same assignee as the present invention. Of course, each conductor serves a plurality of cores in the same capacity in optimumly wired arrays; however, three conductors still thread each core.

The primary object of the invention is to provide a new and improved memory system wherein information is automatically restored upon readout.

Another object of the present invention is to provide an improved memory system which employs an easily fabricated memory array thus saving cost and time in fabrication.

A feature of the invention resides in the use of only two conductors per memory position in the memory array, a read-write conductor and a sense-write conductor. It should be pointed out that neither of the combination conductors is directly driven by the read or the write driving circuits.

Another feature of the invention is the utilization of core driving apparatus for the read-write portion of the memory cycle in conjunction with a third and similar apparatus which under the control of a bias circuit, permits reading of stored data and prevents further reading of data until writing has occurred.

Another feature of the invention resides in the novel utilization of magnetic storage and access devices in combination to achieve automatic rewriting of information without an external command from system logic, and to achieve a change of information upon command of the system logic.

Figure 1:
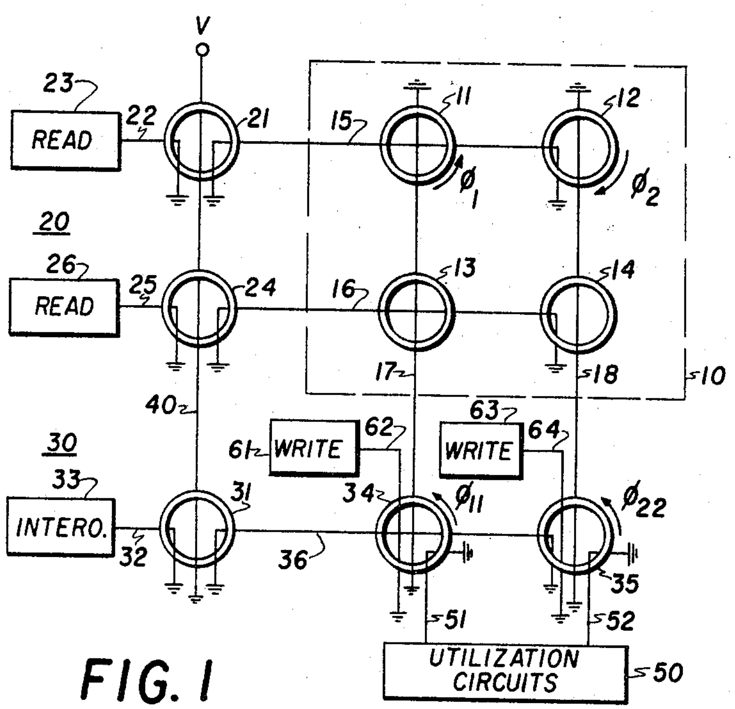
Figure 2:
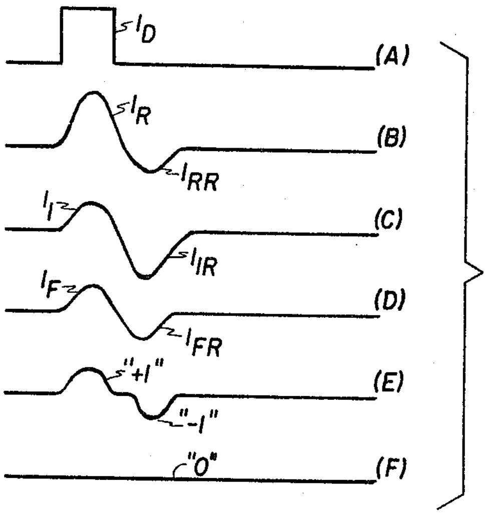

Other objects and features which are not specifically mentioned will become apparent from the following description taken in conjunction with the accompanying drawings in which:

FIG. 1 is a schematic representation of an embodiment of the invention showing by way of a nonlimiting example a 2 x 2 memory array; and FIG. 2 is a graphical illustration of the several waveforms occurring during the operation of the invention, trace A describing the waveforms generated by the read drivers, trace B describing the waveform on the conductors linking the read driving cores and the matrix memory elements, trace C describing the waveform on the conductor between the interrogation core and the memory output cores apparatus, trace D describes the waveform on the conductors linking the matrix memory elements with the corresponding output cores, trace E describes the output waveform for a binary "1" and trace F describes the output waveform for a binary "0."

In FIG. 1 a 2 x 2 memory is described for simplicity. The memory array 10 comprises cores 11–14, cores 11 and 12 constituting a word as do cores 13 and 14. Conductors 15–18 thread the array in an *x–y* two conductor per bit manner. Reading apparatus 20, including cores 21 and 24, drivers 23 and 26 and windings 22 and 25, is coupled to the array via conductors 15 and 16. Interrogation apparatus 30 including elements 31–36 is coupled to apparatus 20 and 10 via the bias conductor 40 and the conductor 40 and the conductors 17, 18 respectively. To complete the system, utilization apparatus 50 is coupled to apparatus 30 via windings 51 and 52, cores 34 and 35 acting as output cores for the memory. These utilization circuits as will become apparent are bipolar responsive. Also, various well known techniques and apparatus may be employed in the utilization circuits to inhibit or enable the driving apparatus. Write drivers 61 and 63 are coupled to cores 34 and 35, respectively, for altering the information content of the memory.

Assuming the cores 11, 12, 34 and 35 are conditioned to magnetic states as indicated by the flux polarity references $\phi_1$, $\phi_2$, $\phi_{11}$ and $\phi_{22}$, the following description will illustrate the operation of the embodiment of FIG. 1.

To read from the memory the word at cores 11 and 12, read driver 23 is enabled providing the current $I_D$ (trace A, FIG. 2) to winding 22. Core 21 is normally biased by the D.C. source and conductor 40 by a technique that is well known in the use of D.C. biased switch core matrix configurations, to one of its remanent states. The current $I_D$ is sufficient to overcome the bias and switch core 21 to its opposite remanent state generating current $I_R$ (trace B) in conductor 15. Current $I_R$ is of a direction and magnitude that is sufficient to reverse the magnetic state of core 11 to an opposite magnetic state, core 12 of course being substantially unaffected since it is already in the desired magnetic direction. The switching of core 11 generates a current $I_F$ in conductor 17 to which core 34 is coupled. There is no switching of core 12; therefore conductor 18 and core 35 are unaffected at this time. Current $I_F$ is not in itself sufficient to reverse the magnetic state of core 34.

The interrogation driver 33 is enabled and provides a current similar to $I_D$ via winding 32 to switch core 31, and it generates current $I_I$ (trace C) in winding 36 which is coupled to cores 34 and 35.

Currents $I_F$ and $I_I$ are sufficient in coincidence to reverse the magnetic state of core 34 and induce a signal "+1" (trace E) in winding 51 which is connected to the utilization circuits 50. Core 35 experiences only current $I_I$ and is not switched; therefore no output is passed via winding 52 to the utilization circuits 50 (see trace F).

The readout cycle is complete. Cores 34 and 35 now have a "1" and a "0" respectively stored therein as was originally stored in memory cores 11 and 12.

At the end of the drive pulses supplied from drivers 23 and 33, the D.C. bias of winding 40 gains control and reswitches cores 21 and 31 back to their original biased states generating currents $I_{RR}$ (trace B) in conductor 15 and $I_{IR}$ in conductor 36.

Current $I_{IR}$ is sufficient to switch all previously switched cores back to their normal state ($\phi_{11}$), which in this illustrative example is core 34, thereby generating a current $I_{FR}$ in conductor 17. Currents $I_{FR}$ and $I_{RR}$ are together sufficient to reswitch core 11 back to state $\phi_1$.

When core 34 is reset the information read is made available a second time as a "−1" (trace E) for checking or other purposes, for example, a parity check may be made. Therefore circuits 50 may advantageously be sensitive to two polarities.

To alter stored information drivers 61, 63 are selectively enabled during the reading portion of the cycle to enhance or cancel the effect of current $I_I$. The automatic rewrite will then insert the new information into array 10.

It should be noted that the coincidence of currents requirement for cores 11–14, 34 and 35 may be met by the design of the turns ratio of the windings and the current flowing therethrough. For example, one experimental model employed turns ratios such that $I_R$ and $I_{IR}$ were at least two times as any of the currents $I_F$, $I_{FR}$ and $I_I$, $I_{RR}$. It may in some cases be advantageous to include the pulse from the interrogation driver timewise within the pulse of a read driver to insure coincident currents.

What is claimed is:

1. A magnetic memory system comprising: a storage matrix including a first plurality of bistable magnetic cores in columns and rows, a plurality of row conductors each of which is inductively coupled to a separate row of cores, and a plurality of column conductors each of which is inductively coupled to a separate column of cores, there being only two conductors per core, the corresponding one of said column conductors and the corresponding one of said row conductors; a second plurality of bistable magnetic cores which are individually inductively coupled to said plurality of row conductors; a third plurality of bistable magnetic cores which are individually inductively coupled to said plurality of column conductors; a fourth bistable magnetic core; another conductor inductively coupling said plurality of third cores and said fourth core; means for selectively energizing one of said second cores to generate a first bipolar signal on the corresponding row conductor, all cores of said corresponding row which are in their first states being switched to their second states in response to the generation of the first polarity of said first bipolar signal to place output signals on the corresponding column conductors; means for energizing said fourth core to generate a second bipolar signal on said other conductor, said plurality of third cores being switched from their first to their second states in response to the first polarity of said second bipolar signal in coincidence with the output signals on said corresponding column conductors, said third plurality of cores being switched back to their first states in response to the second polarity of said second bipolar signal to place input signals on said column conductors, and the cores of said corresponding row being switched back to their first states in response to said input signals in coincidence with the second polarity of said first bipolar signal.

2. A magnetic memory system according to claim 1, comprising writing means coupled to said third plurality of cores and operable to control the generation of said input signals information during information transfer from said third cores to the selected row of first cores.

References Cited

UNITED STATES PATENTS

| | | | |
|---|---|---|---|
| 2,691,155 | 10/1954 | Rosenberg et al. | 340—174 |
| 2,734,187 | 2/1956 | Rajchman | 340—174 |
| 2,768,367 | 10/1956 | Rajchman | 340—174 |
| 3,296,600 | 1/1967 | Einsele | 340—174 |
| 3,341,830 | 9/1967 | Conrath | 340—174 |

OTHER REFERENCES

Publication I: Convention of Ferrites, "A Magnetic Core Matrix Store With Direct Selection Using A Magnetic-Core Switching Matrix," by Renwick, pp. 436–444; November 1956.

Publication II: IBM Technical Disclosure Bulletin, "Matrix Store With Short Reset Time," by Christopherson; vol. 5; No. 10; March 1963.

STANLEY M. URYNOWICZ, Jr., *Primary Examiner.*